United States Patent [19]

Black et al.

[11] Patent Number: 5,413,859
[45] Date of Patent: May 9, 1995

[54] SUBLIMITABLE CARBON-CARBON STRUCTURE FOR NOSE TIP FOR RE-ENTRY SPACE VEHICLE

[75] Inventors: William E. Black; Ebrahim M. Parekh, both of San Diego, Calif.

[73] Assignee: Lockhead Corporation, Fort Worth, Tex.

[21] Appl. No.: 967,369

[22] Filed: Oct. 28, 1992

[51] Int. Cl.$^6$ .............................................. B32B 9/00
[52] U.S. Cl. ..................... 428/408; 428/236; 428/245; 428/246; 428/368; 428/422; 428/902; 244/121; 244/158 A
[58] Field of Search ............... 428/368, 408, 902, 117, 428/259, 257, 225, 233, 236, 245, 246, 256, 422; 244/121, 158 A

[56] References Cited

U.S. PATENT DOCUMENTS

| H140 | 10/1986 | Bruns | 428/408 |
|---|---|---|---|
| 3,267,857 | 8/1966 | Lindberg, Jr. | 244/158 A |
| 4,016,322 | 9/1977 | Haldeman | 244/158 A |
| 4,131,708 | 12/1978 | Moores | 428/259 |
| 4,196,230 | 4/1980 | Gibson | 428/408 |
| 4,201,611 | 5/1980 | Stover | 428/902 |
| 4,278,729 | 7/1981 | Gibson | 428/368 |
| 4,392,624 | 7/1983 | Myer | 244/121 |
| 4,515,897 | 5/1985 | Taverna | 428/408 |
| 4,554,024 | 11/1985 | Zimmer | 428/408 |
| 4,739,952 | 4/1988 | Giles | 244/158 A |
| 5,080,306 | 1/1992 | Porter | 244/158 A |
| 5,108,830 | 4/1992 | Osaka | 244/121 |
| 5,291,830 | 3/1994 | Zwan | 244/158 A |

Primary Examiner—Ellis P. Robinson
Assistant Examiner—Timothy M. Speer
Attorney, Agent, or Firm—John R. Duncan; Frank D. Gilliam

[57] ABSTRACT

A thermal protection system arrangement and method of manufacture for a carbon-carbon nose tip of a re-entry-space vehicle that is expected to encounter very high heat fluxes upon re-entry into the earth's atmosphere. The arrangement includes a carbon-carbon nose tip which has a first sublimatable material infiltrated into the outer portion of the nose tip for release of thermal energy to the environment during the high heat fluxes of re-entry. A second sublimatable material which sublimates at heat fluxes materially less than that of the first sublimatable material is infiltrated into the inner portion of the nose tip so that the nose tip releases energy to the environment and erodes in a controlled manner thereby maintaining the interior of the nose tip at a desired temperature. The first sublimatable material is preferably a refractory element which has been partially converted to a sublimatable carbide during carbonization and graphitization of the carbon-carbon nose tip and is further converted to a carbide during re-entry. The second sublimatable material is preferably a fluorocarbon which sublimates at a lower temperature when the internal structure of the carbon-carbon nose tip reaches a predetermined temperature, thereby permitting the carbon-carbon nose tip to achieve temperatures well in excess of those presently obtainable by known other structures.

7 Claims, 1 Drawing Sheet

SUBLIMITABLE CARBON-CARBON STRUCTURE FOR NOSE TIP FOR RE-ENTRY SPACE VEHICLE

BACKGROUND OF THE INVENTION

1. Field of the Invention

This invention relates to an improvement in the structure of a carbon-carbon nose tip for a re-entry space vehicle and more particularly, but not by way of limitation, to a sublimating thermal protection carbon-carbon nose tip structure which provides heat absorption externally and internally of the nose tip structure during re-entry and a preferred method of manufacture.

2. Description of the Prior Art

It is well known that an object entering the earth's atmosphere at even moderate speed is heated considerably by the attendant aerodynamic conditions at the surface of the object. Such heating occurs when vehicles re-enter the atmosphere and is a serious problem, forcing drastic limitations on the maximum re-entry speed which a structure of given design can attain without being severely damaged or even destroyed. This heat is primarily developed and is largely concentrated at the nose.

An important object of the present invention is to efficiently dissipate the heat developed at the nose. By achieving this object, the invention makes it possible to use higher re-entry speeds and therefore gives greater freedom in space vehicle design.

The nose tip of a re-entry vehicle is required to withstand heating encountered during atmospheric entry, maintain the structural integrity of the vehicle, prevent overheating of the payload, and maintain the aerodynamic characteristics of the vehicle. As the vehicle travels through the earth's atmosphere it experiences frictional heating in the boundary layer at its surface. The nose tip is also subjected to heat from gases that are at elevated temperatures as a result of being decelerated by the bow shock wave.

The amount of heat transferred to the nose tip depends on its shape and the materials from which it is made. The bow shock wave heats the gases behind it. The heat reaches the nose tip in the form of convection and radiation through the boundary layer adjacent to the surface.

Even for a properly designed nose tip shape, it is inevitable that some fraction of the vehicle's initial kinetic energy will finally reach the nose tip in the form of heat. Ablation is used to provide surface protection. Heat can be diverted from the re-entry space vehicle by allowing the nose tip's outer layer of material to melt, vaporize or sublime. While ablation provides excellent thermal protection, the resulting change in profile due to surface recession can adversely change the aerodynamic characteristics of the space vehicle. Additionally, adequate strength must be provided to prevent mechanical erosion of the nose tip by aerodynamic shear stresses.

Although the nose tip is a sacrificial item, it is desired that ablation be controlled, i.e., that the nose tip profile remain substantially the same throughout the period of re-entry, under any weather conditions, which may range from essentially clean air to high levels of dust and water droplets.

The manner in which an ablative material absorbs thermal energy is basically due to its ability to dissipate absorbed thermal energy by melting, vaporization and/or sublimation of surface material. By absorbing and dissipating large amounts of thermal heat the ablative material limits the temperature rise of the underlying structural shell and the internal components of the vehicle. While temperature limitation generally is the principal criterion in selecting and ablative material, mechanical performance of the ablative material generally is also an important consideration.

Lindberg, Jr., U.S. Pat. No. 3,682,100 discloses in a space vehicle a nose having an imperforate outer surface and incorporating adjacent such surface a heat-dissociable metallic hydride mixed within a porous ceramic so that heat developed at the nose surface during flight in the atmosphere is used to cause the hydride to emit hydrogen gas, thereby tending to reduce the temperature of the nose surface.

Taverna et al, U.S. Pat. No. 4,515,847 discloses a re-entry carbon-carbon nose tip structure which has its outer portion loaded with a heat-resisting particulate material to provide a desired ablative performance in said nose tip structure.

Moores et al, U.S. Pat. No. 4,131,708 discloses an ablative carbon-composite shaped structure for high temperature thermal protection which includes a carbon-carbon composite reinforced body which is provided with implants in the form of elongate columns of a refractory metal carbide that are aligned parallel with one another axially in the direction of expected thermal flux and which are positioned at predetermined locations of expected thermal flux through said structure.

It is apparent that the prior art does not disclose a carbon-carbon space structure which uses a first sublimation activity on its outer surface when very high heat fluxes are encountered during re-entry and a second sublimation activity on its inner surface when the internal surface reaches a specific temperature thereby enabling the space structure to retain its basic geometry while sustaining a thermal environment well in excess of that presently achievable by known thermal protection systems. While certain aspects of the above disclosed prior art are of interest, they do not teach the particular thermal protection system utilizing two independent sublimating activities nor do they teach the subject method of fabricating such a novel thermal protection system for a carbon-carbon structure for a re-entry vehicle.

SUMMARY OF THE INVENTION

Briefly stated, the present invention contemplates a thermal protection system arrangement and method of manufacture for a carbon-carbon nose tip of a re-entry space vehicle that is expected to encounter very high heat fluxes, e.g. 100–150 kW/cm$^2$ upon re-entry of the space vehicle into the earth's atmosphere. The thermal protection system arrangement includes a carbon-carbon nose tip which has a first sublimatable material infiltrated into the outer portion of the nose tip for release of thermal energy to the environment during the high heat fluxes of re-entry. A second sublimatable material which sublimates at heat fluxes materially less than that of the first sublimatable material is infiltrated into the inner portion of the nose tip so that the nose tip releases energy to the environment and erodes in a controlled manner thereby maintaining the interior of the nose tip at a desired temperature. The first sublimatable material is preferably a refractory element which has been partially converted to a sublimatable carbide during carbonization and graphitization of the carbon-carbon nose tip. During re-entry the high heat fluxes cause the carbide to sublime and the additional refractory element to react with the adjacent carbon-carbon to form additional carbide which will also sublime.

The second sublimatable material is preferably a fluorocarbon which also sublimates but at a lower temperature when the internal structure of the carbon-carbon nose tip reaches a predetermined temperature, thereby permitting the carbon-carbon nose tip to achieve temperatures well in excess of those presently obtainable by other known structures. Thus, during high temperature, high heat flux conditions the carbide matrix of the outer layer will sublime and ablate in a controlled manner and the inner portion will also sublime at a lower temperature to release additional thermal energy.

While the thermal protection system of the invention is embodied in a unitary carbon-carbon nose tip of a re-entry space vehicle, the outer portion of the nose tip can be considered as the outer surface of the nose tip or as outer layers superimposed on the nose tip. Similarly, the inner portion of the nose tip may be considered as the inner surface of a primary nose tip structure or as inner layers formed on the interior of the nose tip. The thermal protection system would be equally applicable to other surfaces encountering high temperatures in operation such as leading edges of a space vehicle.

This invention, as well as other features, objects and advantages thereof, will be readily apparent from consideration of the following detailed description relating to the accompanying drawings in which like reference characters designate like, or corresponding parts throughout the several views, and wherein;

DESCRIPTION OF THE PREFERRED EMBODIMENT

Figure 1:
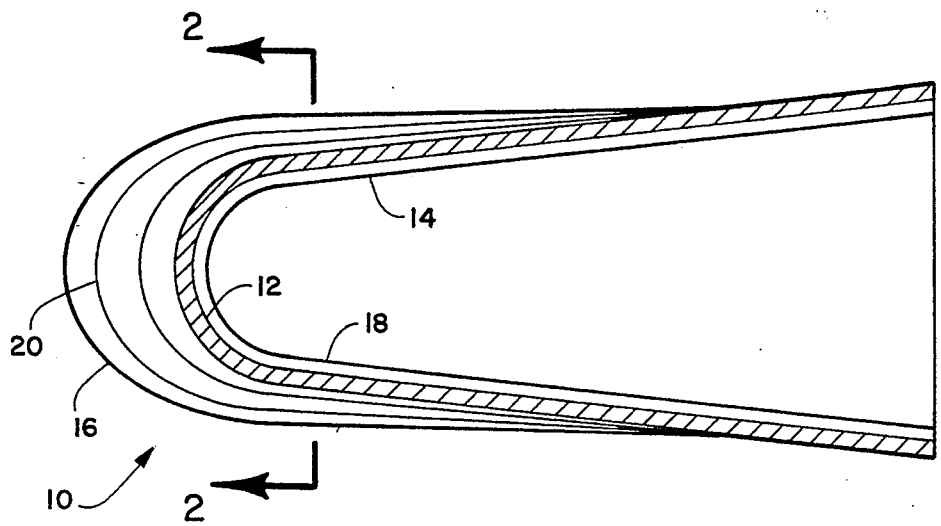
FIG. 1 is a simplified cross section of a re-entry nose tip constructed in accordance with a preferred embodiment of the present invention.
Figure 2:
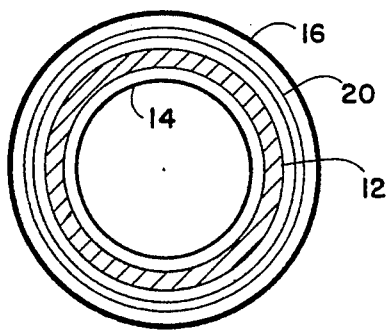
FIG. 2 is a sectional view taken along lines A—A of FIG. 1.

Referring now to the drawings in detail and in particular to FIGS. 1 and 2, the reference character 10 generally designates a thermal protection system arrangement for a nose tip of a re-entry space vehicle that is expected to encounter very high heat fluxes upon re-entry into the earth's atmosphere. The arrangement 10 includes a carbon-carbon primary structure 12 which is illustrated as being the nose tip of a space vehicle. While a nose tip is illustrated, it is to be understood that other structures such as a leading edge of a wing or other surface that is expected to encounter very high temperatures is also anticipated, very high heat fluxes e.g., 100 to 150 kW/cm$^2$ during operational conditions such as re-entry into the earth's atmosphere. The nose tip 12 is generally illustrated as being generally conical in shape with a blunt end and an interior cavity 14.

The arrangement 10 may be considered to include a primary structure 12 and a outer covering or surface 16 and an inner covering or inner surface 18. In any event, the arrangement 10 is to be viewed as a unitary product. The method of constructing the carbon-carbon primary structure 10 will be described hereinafter.

The outer surface or portion 16 is arranged to provide a first area of sublimating activity. The surface 16 may be considered to be a unitary covering or as shown in FIGS. 1 and 2 to be a plurality of layers 20 that are superimposed upon the carbon-carbon primary structure 12. Whether the outer surface 16 of the structure 12 is constructed as one layer or as a plurality of layers or as part of the primary structure 10 will be determined by the particular manufacturing method employed as well as the particular sublimating activity desired. The outer surface or layer 16 has a plurality of refractory elements suitably disposed therein. These refractory elements are composed of a refractory metal such as niobium, hafnium, titanium, tantalum, tungsten or zirconium are disposed in the outer layer 16 in any suitable manner such as by weaving or layering therein a plurality of refractory metal filaments.

Figure 3:
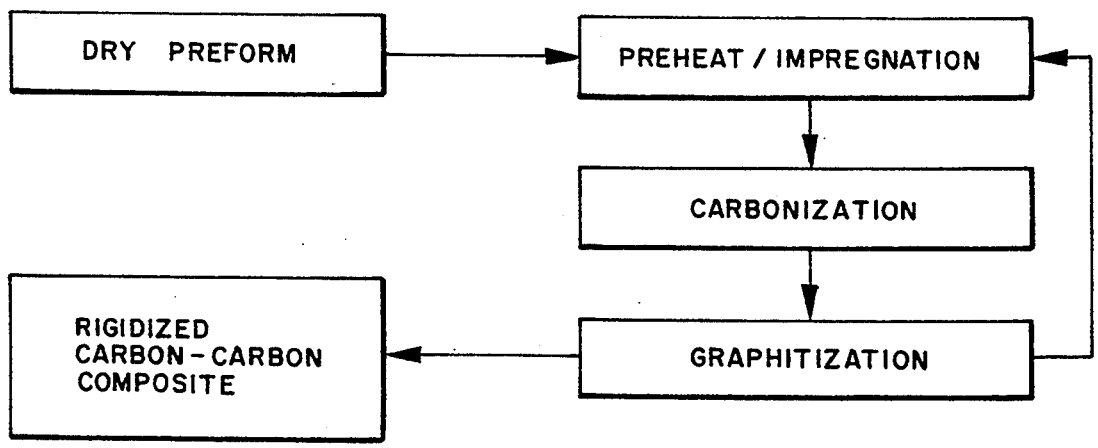
FIG. 3 is a flow chart of the rigidizing cycle for the sublimatable carbon-carbon nose tip of FIG. 1.

Referring now to FIG. 3, a presently preferred method of processing the outer layer 16 and the carbon-carbon primary structure 12 is shown. A suitable dry preform of the outer portion 16, for example, has filaments of a refractory metal woven therein is preheated to approximately the temperature of impregnation. The heated preform is then impregnated with pitch at about 1 atm pressure. The impregnated preform is heated at a controlled rate, e.g., 35 degrees C./hr. to about 650 to 725 degrees C. The thus-baked impregnated preform is then graphitized at about 2300 C. to 2750 C. The impregnation, baking, graphitization cycle is repeated as necessary to achieve a desired bulk density. During this processing, for example, during the carbonization and graphitization stages the refractory filaments will be partially transformed into carbides due to their intimate proximity to free carbon in the carbon-carbon matrix.

Similarly, the inner layer or portion 18 has a low temperature sublimatable material such as a fluorocarbon infiltrated therein in any suitable manner. A suitable fluorocarbon would be polytetrafluoroethylene. What is provided in this event is a area of sublimating activity which is activated at a temperature which is materially less that the temperature at which the first area of sublimating activity is activated. The inner layer 18 would be constructed in the manner taught by the method shown in FIG. 3.

Thus, during high temperature, high heat flux operational conditions such as are encountered by a space vehicle in re-entry into the earth's atmosphere the carbide matrix of the outer layer 16 will sublime, that is go directly from the solid state to the gaseous state, and erode in a controlled manner and in the process release thermal energy into the environment. However, the metallic carbides are reactive with the carbon matrix not only during the processing of the carbon-carbon (the carbonization and graphitization stages) but also during flight operations. Thus, the portion of the refractory metal that was not converted to carbides during the carbon-carbon processing will in situ be completely converted to carbides and will then continue on to sublimation thereby increasing the capability of the arrangement 10 to absorb thermal energy.

During flight operations when the inner layer 14 reaches an appropriate temperature the second area of sublimating activity will be activated and the sublimatable material contained in the inner layer 18 will also sublime thereby releasing additional thermal energy. The combined first and second sublimating activities will then enable a normal carbon-carbon structure to sustain a thermal environment well in excess of that presently achievable by presently known systems. Thus, the present invention provides for a uniform rate of erosion or ablation by the outer layer 16, good mechanical strength, and thermal protection of the primary structure.

Although the thermal protection system arrangement and method of construction of the present invention has been shown as described with reference to a particular embodiment, nevertheless, various changes and modifications obvious to one skilled in the art to which the invention pertains are deemed within the purview of the invention.

We claim:

1. A thermally stable nose tip for a re-entry vehicle that is subjected to high heat fluxes, comprising:

a carbon-carbon composite nose tip provided with an interior cavity, wherein the exterior portion of said carbon-carbon composite nose tip contains a refractory metal material which will sublime at heat fluxes of about 100 to 150 kW/cm$^2$, thereby releasing thermal energy to the environment; and the inner portion of said carbon-carbon composite nose tip adjacent to said interior cavity contains a polytetrafluoroethylene material which will sublime at a level of heat flux which is less than the heat flux at which said refractory metal material in the exterior portion of said carbon-carbon composite nose tip sublimes, to release additional thermal energy.

2. The thermally stable nose tip of claim 1 wherein the refractory material is selected from the group consisting of niobium, hafnium, titanium, tantalum, tungsten and zirconium.

3. A thermally stable nose tip for a re-entry vehicle that is subjected to high heat fluxes, comprising:

a nose tip for a re-entry vehicle which is provided with an interior cavity;

a carbon-carbon composite coating applied to the exterior of said nose tip, wherein said carbon-carbon composite coating comprises a refractory metal material which will sublime at heat fluxes of about 100 to 150 kW/cm$^2$, thereby releasing thermal energy to the environment; and a carbon-carbon composite coating applied to the inner portion of said nose tip adjacent to said interior cavity, wherein said carbon-carbon composite coating contains a polytetrafluoroethylene material which will sublime at a level of heat flux which is less than the heat flux at which said refractory metal material in said carbon-carbon composite coating applied to the exterior of said nose tip sublimes, to release additional thermal energy.

4. The thermally stable nose tip of claim 3 wherein the nose tip comprises a carbon-carbon structure.

5. The thermally stable nose tip of claim 4 wherein the outer carbon-carbon coating comprises at least one layer of a matrix and carbon reinforcing refractory metal elements.

6. The thermally stable nose tip of claim 4 wherein the outer carbon-carbon coating comprises a plurality of superimposed carbon-carbon layers that form a unitary composite structure with the underlying carbon-carbon nose tip structure.

7. The thermally stable nose tip of claim 3 wherein said outer carbon-carbon layer contains refractory metal filaments that are selected from the group consisting of niobium, hafnium, titanium, tantalum, tungsten and zirconium.

* * * * *